US009167746B2

(12) United States Patent  
Bassett et al.

(10) Patent No.: US 9,167,746 B2  
(45) Date of Patent: Oct. 27, 2015

(54) CARTED WHEEL RAKE WINDROW ADJUSTMENT APPARATUS

(71) Applicant: KUHN NORTH AMERICA, INC., Brodhead, WI (US)

(72) Inventors: William Bassett, Brodhead, WI (US); Jeff Marggi, Oregon, WI (US); George Cicci, Fitchburg, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 222 days.

(21) Appl. No.: 13/840,370

(22) Filed: Mar. 15, 2013

(65) Prior Publication Data

US 2013/0263567 A1    Oct. 10, 2013

Related U.S. Application Data

(60) Provisional application No. 61/622,047, filed on Apr. 10, 2012.

(51) Int. Cl.
| | | |
|---|---|---|
| *A01D 76/00* | (2006.01) | |
| *A01D 78/00* | (2006.01) | |
| *A01D 80/00* | (2006.01) | |
| *A01D 84/00* | (2006.01) | |
| *A01D 7/04* | (2006.01) | |
| *A01D 78/14* | (2006.01) | |

(52) U.S. Cl.
CPC ............ *A01D 7/04* (2013.01); *A01D 78/14* (2013.01); *A01D 78/144* (2013.01)

(58) Field of Classification Search
CPC ... A01D 78/146; A01D 78/144; A01D 78/14; A01D 78/1014; A01D 78/08; A01D 78/142; A01B 73/067

USPC .................................................... 56/377, 397  
See application file for complete search history.

(56) References Cited

U.S. PATENT DOCUMENTS

| | | | | | |
|---|---|---|---|---|---|
| 2,602,280 | A | * | 7/1952 | Crowe et al. ................... | 56/377 |
| 2,892,299 | A | * | 6/1959 | Van Der Lely et al. ........ | 56/370 |
| 2,892,300 | A | * | 6/1959 | Van Der Lely .................. | 56/377 |
| 2,993,327 | A | * | 7/1961 | Van Der Lely et al. ........ | 56/377 |
| 2,993,328 | A | * | 7/1961 | Van Der Lely et al. ........ | 56/377 |
| 3,004,378 | A | * | 10/1961 | Van Der Lely et al. ........ | 56/377 |

(Continued)

OTHER PUBLICATIONS

Pequea, Tradition in Progress®; Pequea Turbo Rake, Models TR8, TR10, TR12, Operator's Manual; Manual #990030; Revised Oct. 2008; front cover page, pp. 1-16 and back cover page.

(Continued)

*Primary Examiner* — Árpád Fábián-Kovács  
(74) *Attorney, Agent, or Firm* — Oblon, McClelland, Maier & Neustadt, L.L.P.

(57) ABSTRACT

A rake includes a frame and at least one arm assembly attached to the frame via an arm member. The arm assembly includes a main beam coupled to the arm member. The main beam includes a first member pivotally attached to a second member, and the angle between the first and second members is adjustable. The arm assembly further includes a first rake wheel unit connected to the first member and a second rake wheel unit connected to the second member. The arm assembly attaches to the frame such that in a work position, the first and second rake wheel units are disposed substantially horizontally extended with respect to frame, and in a transport position, the first and second rake wheel units are disposed substantially vertically above the frame.

11 Claims, 16 Drawing Sheets

(56) References Cited

U.S. PATENT DOCUMENTS

| | | | |
|---|---|---|---|
| 3,145,522 A * | 8/1964 | Zink | 56/377 |
| 3,778,987 A * | 12/1973 | Rankins | 56/377 |
| 3,977,166 A * | 8/1976 | Delgado Delgado | 56/366 |
| 4,047,370 A * | 9/1977 | Eve | 56/377 |
| 4,753,063 A * | 6/1988 | Buck | 56/377 |
| 5,127,216 A * | 7/1992 | Kelderman | 56/15.9 |
| 5,155,986 A * | 10/1992 | Kelderman | 56/365 |
| 5,752,375 A * | 5/1998 | Tonutti | 56/365 |
| 6,000,207 A * | 12/1999 | Menichetti et al. | 56/365 |
| 6,109,012 A * | 8/2000 | Staal et al. | 56/367 |
| 6,212,866 B1 * | 4/2001 | Rowse et al. | 56/384 |
| 6,314,710 B1 | 11/2001 | Tonutti | |
| 6,405,517 B1 * | 6/2002 | Peeters et al. | 56/377 |
| 7,318,312 B2 | 1/2008 | Cicci et al. | |
| 7,584,595 B2 | 9/2009 | Marggi et al. | |
| 7,849,933 B2 | 12/2010 | Marggi | |
| 8,001,755 B2 | 8/2011 | Menichetti et al. | |
| 8,146,338 B1 | 4/2012 | Cicci et al. | |
| 8,186,140 B1 | 5/2012 | Cicci et al. | |
| 2005/0126154 A1 * | 6/2005 | Tonutti | 56/377 |
| 2005/0210856 A1 * | 9/2005 | Menichetti | 56/377 |
| 2006/0185342 A1 * | 8/2006 | Hruska et al. | 56/378 |
| 2007/0068134 A1 * | 3/2007 | Cicci et al. | 56/377 |
| 2010/0293915 A1 * | 11/2010 | Westlake et al. | 56/365 |

OTHER PUBLICATIONS

Vermeer "Rakes", pp. 1-16, Aug. 2011.
Sitrex S.p.A.; Agricultural Machinery "QRake Aug. 10, 2012" pp. 1-4, Aug. 2012.
Pequea product photograph, Jan. 2008, USA.
Pequea product photograph, Feb. 2013, USA.

* cited by examiner

US 9,167,746 B2

CARTED WHEEL RAKE WINDROW ADJUSTMENT APPARATUS

RELATED APPLICATIONS

This application is a non-provisional claiming priority to U.S. Provisional Application Ser. No. 61/622,047 filed Apr. 10, 2012, the entire contents of which is incorporated herein by reference.

BACKGROUND

1. Field

The embodiments discussed herein relate to a carted rake wheel apparatus including an adjustment unit that allows a user to vary the windrow width.

2. Description of the Related Art

On a carted wheel rake, the raking width, raking wheel angle, and windrow width are important settings for the user. Current carted rake wheel designs have adjustments which allow the raking width, angle, and windrow width to be adjusted collectively, but not each independently. Because the rake wheels are all on one common beam, the width of the front wheel (raking width) and angle of the beam affects the position of the rear wheel (which defines the windrow width).

For example, to maximize the amount of material raked with a carted V rake, the rake is adjusted to make the V as wide as possible. This is done by moving the main beams longitudinally out away from the rake cart. This makes the V wide at the front, but also increases the width of the opening in the back (windrow width). In order to create a windrow that is able, for example, to be subsequently picked up with a harvester, current designs utilize the ability to adjust the overall angle of the main beam with respect to the direction of travel. Increasing the beam angle causes the front to get wider and the back to get narrower, which results in a narrower windrow. Although this is a solution in some conditions, in other conditions, such as heavy, wet crop, and/or windy conditions, a high rake wheel beam angle does not provide adequate raking quality. In these other conditions, the rake wheel beam angle needs to be reduced, and in order to achieve the desired windrow width, the overall raking width will need to be reduced as well.

SUMMARY

According to an embodiment of the present disclosure, a carted rake includes a frame and at least one arm assembly attached to the frame via an arm member. The arm assembly includes a main beam coupled to the arm member. The main beam includes a first member pivotally attached to a second member, and the angle between the first and second members is adjustable. The arm assembly further includes a first rake wheel unit connected to the first member and a second rake wheel unit connected to the second member. The arm assembly attaches to the frame such that in a work position, the first and second rake wheel units are disposed substantially horizontally extended with respect to frame, and in a transport position, the first and second rake wheel units are disposed substantially vertically above the frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

DETAILED DESCRIPTION

In the following description, the present advancement will be discussed by describing preferred embodiments with reference to the accompanying drawings. However, those skilled in the art will realize other applications and modifications within the scope of the disclosure as defined in the enclosed claims.

Initially, it is noted that the entirety of U.S. Pat. No. 7,318,312 is incorporated herein by reference.

Figure 1:
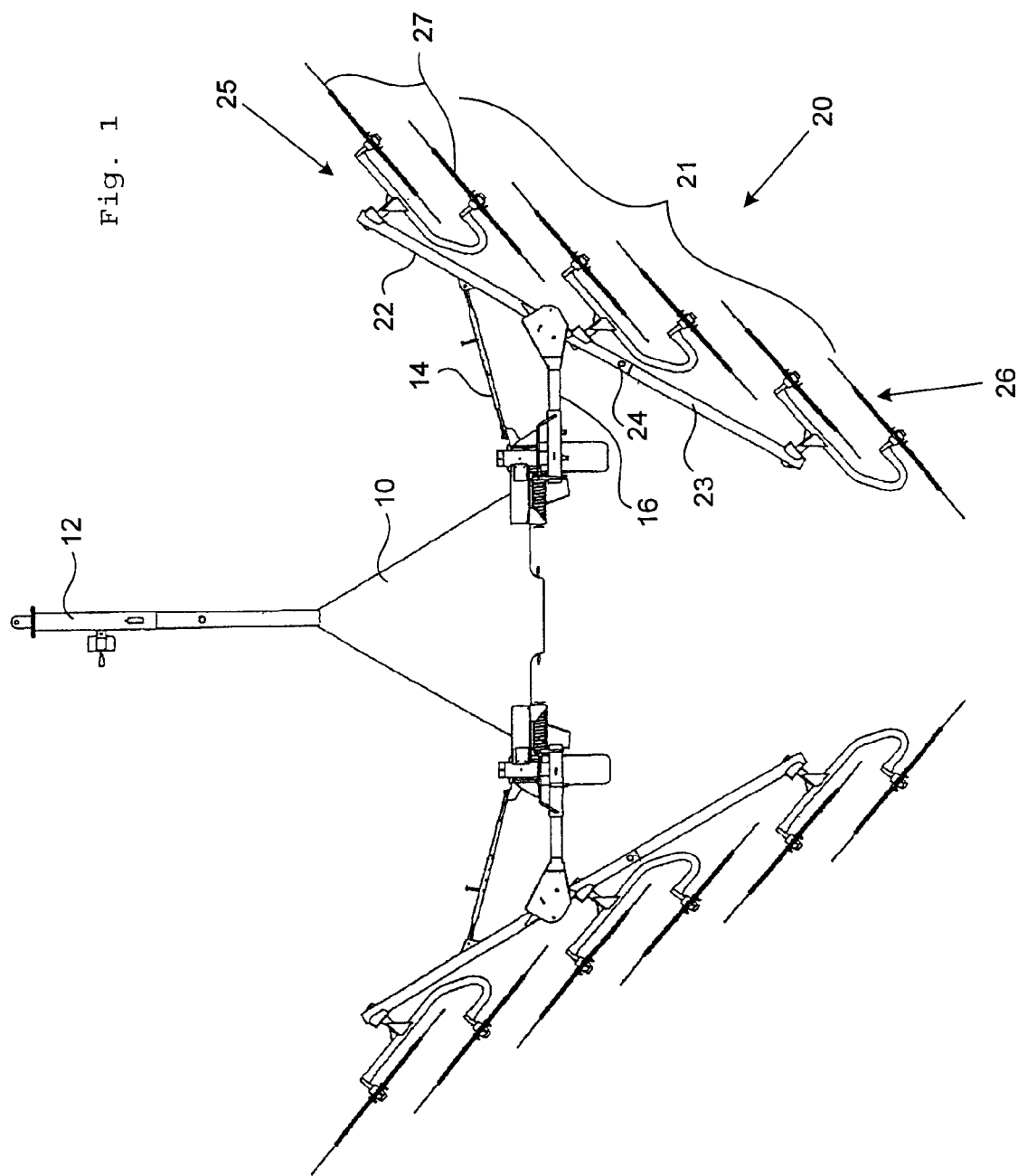
FIG. 1 is a top view of an exemplary embodiment of the carted wheel rake.
Figure 2:
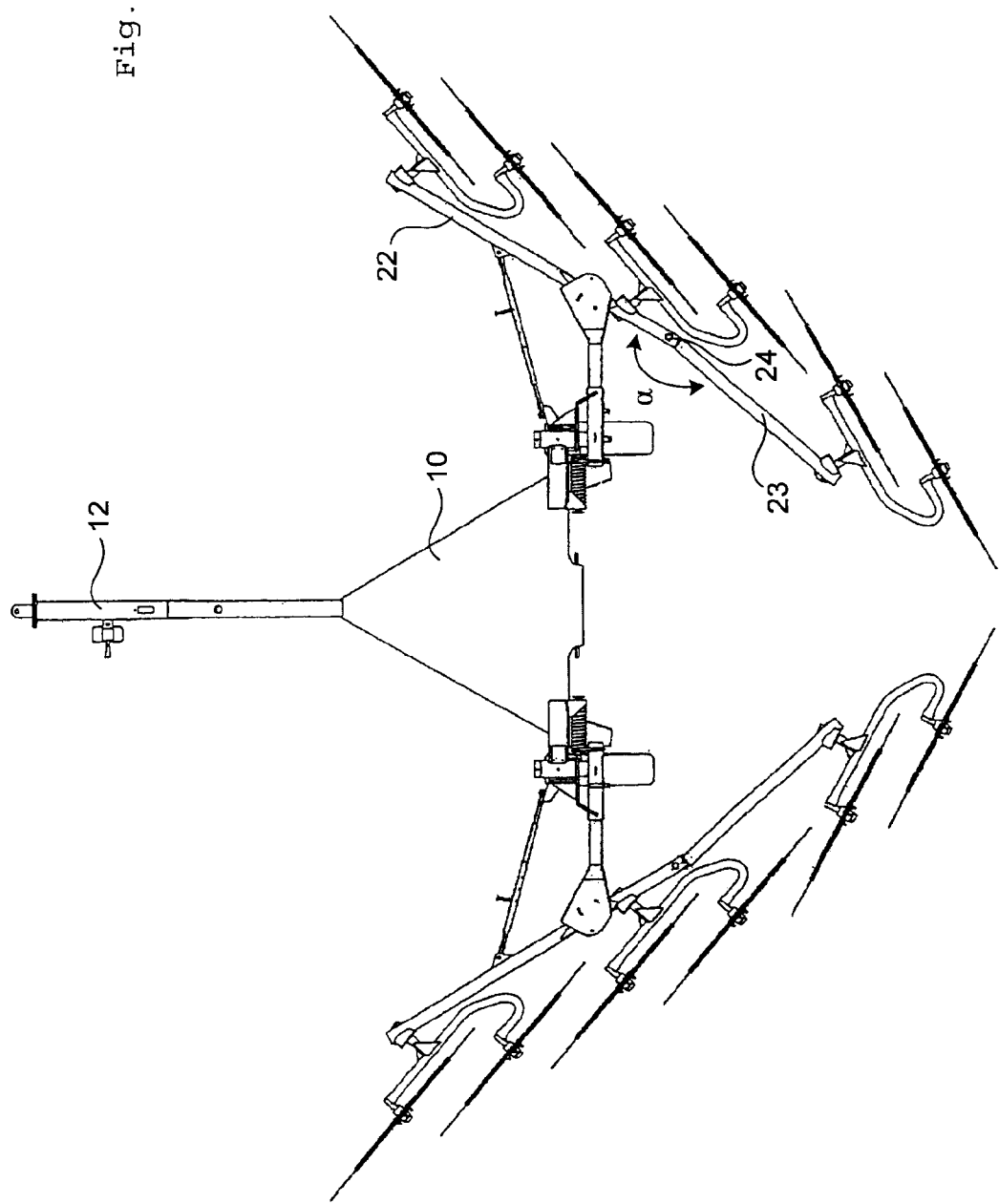
FIG. 2 is a top view of the exemplary embodiment of the carted wheel rake in FIG. 1 with an adjustment to the angle between the members of the main beam.
Figure 3:
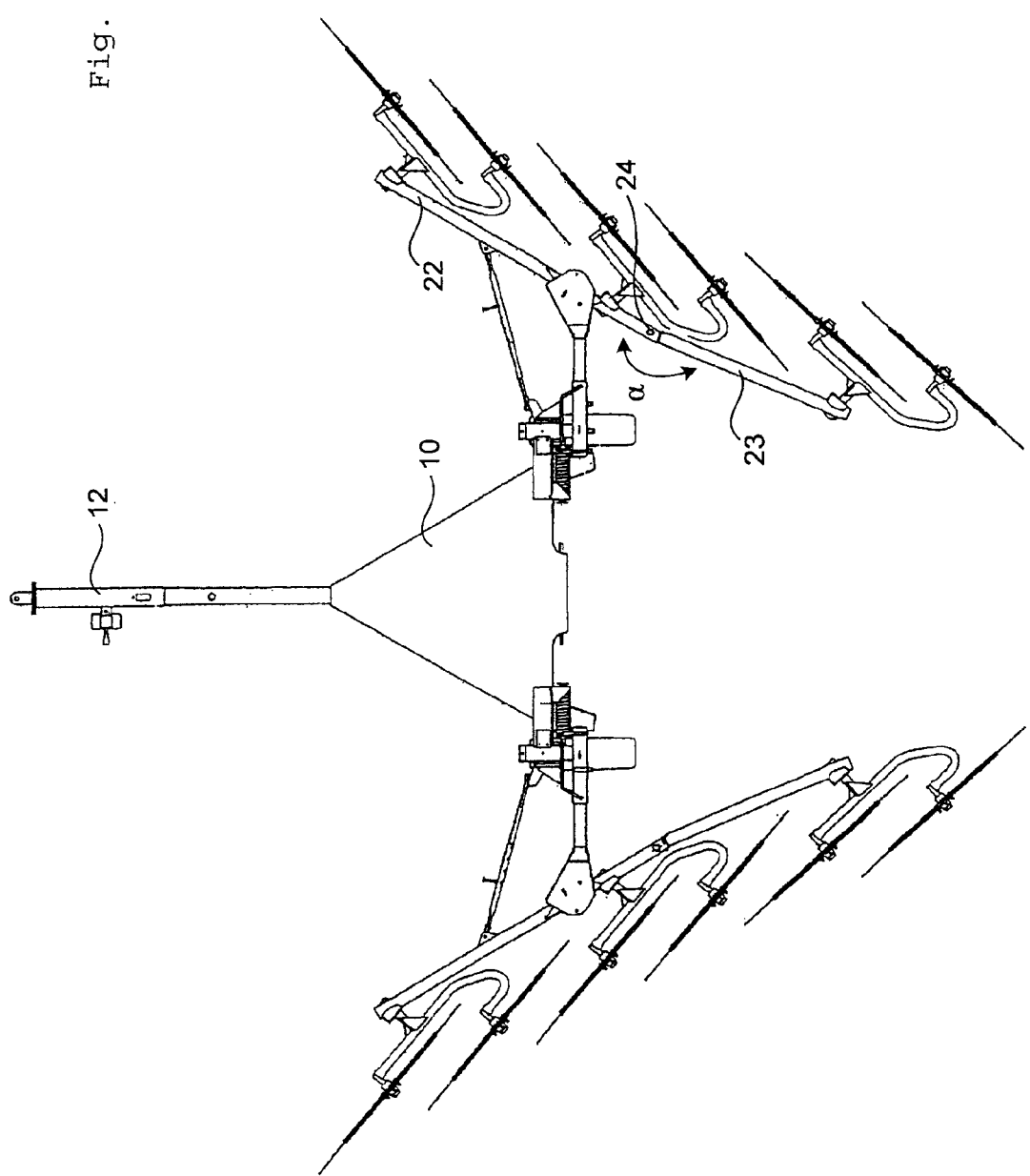
FIG. 3 is a top view of the exemplary embodiment of the carted wheel rake in FIG. 1 with another adjustment to the angle between the members of the main beam.

FIGS. 1-3 each show a top view of the carted wheel rake generally with slight variations among the figures with respect to the positions of the main beams 21 of the arm assemblies 20. The carted wheel rake includes a frame 10 and a tongue hitch 12 extending from the frame 10. Each side of the frame 10 shown in FIG. 1 has coupled thereto an arm assembly 20. The carted wheel rake is shown in FIGS. 1-3 with the arm assemblies 20 disposed substantially horizontally extended with respect to frame 10. It is noted that, while FIGS. 1-3 show a carted wheel rake including an arm assembly 20 on each side, for the sake of convenience and simplification, only one arm assembly on each figure is annotated with reference numerals indicating the parts described herein. It is expected that one skilled in the art will understand that the corresponding parts of the unannotated, opposing arm assembly correspond likewise to the annotated parts, which are described in greater detail herein.

As indicated above, the arm assembly 20 includes a main beam 21. The main beam 21 includes a first member 22 and a second member 23. The first member 22 is coupled directly to the frame 10 via an arm member 16. The second member 23 extends from the first member 22 rearwardly with respect to a direction of forward travel of the frame 10 (when towed via the tongue hitch 12). Also shown in FIGS. 1-3 (labeled in FIG. 1) is an arm angle adjustment member 14 that assists in adjusting the angle of the main beam 21 with respect to the arm member 16. The arm angle adjustment member 14 is not discussed in further detail herein.

The arm assembly 20 includes at least one first rake wheel unit 25 coupled to the first member 22 and at least one second rake wheel unit 26 coupled to the second member 23. Each of the first rake wheel unit 25 and second rake wheel unit 26 includes at least one floating rake wheel 27, or a pair of floating rake wheels 27.

The second member 23 is able to pivot with respect to the first member 22 at a pivot axis 24. The pivot axis 24 may be formed of a pin or other suitable pivoting joint means. By way of the pivot axis 24, it is possible to adjust the relative angle $\alpha$ between the first member 22 and the second member 23 to range between a reflex angle (greater than 180°) and an obtuse angle (greater than 90° but less than 180°).

Thus, as a means of windrow adjustment for the user, the rake arm assemblies 20 are split into a front end and a rake arm assembly back end. The adjustment means includes the main beam 21 that is split into a front and rear section, the first member 22 and second member 23, respectively, which allows the relative angle $\alpha$ between the second wheel unit 26 (in the rear) and the first wheel unit 25 (in the front) to be adjusted. This allows the width of the windrow, as determined by the width of the opposing rear rake wheels, to be varied independently from the width of the rake arm assembly front end. As such, the user can maximize the overall raking width, keep the rake wheel angle at an acceptable value for raking quality, and create a windrow that is of acceptable width.

FIGS. 4-10 show various different embodiments (and positions) of adjustment means for adjustment of the windrow. This adjustment means includes an adjustment unit 30, as generically labeled in FIGS. 4-10. Other specifically described embodiments of the adjustment unit 30 are indicated as adjustment unit 30(50), seen in paired FIGS. 4 and 5; adjustment unit 30(70), seen in paired FIGS. 8 and 9; and adjustment unit 30(60), as depicted in detail in FIGS. 11-14.

Figure 4:
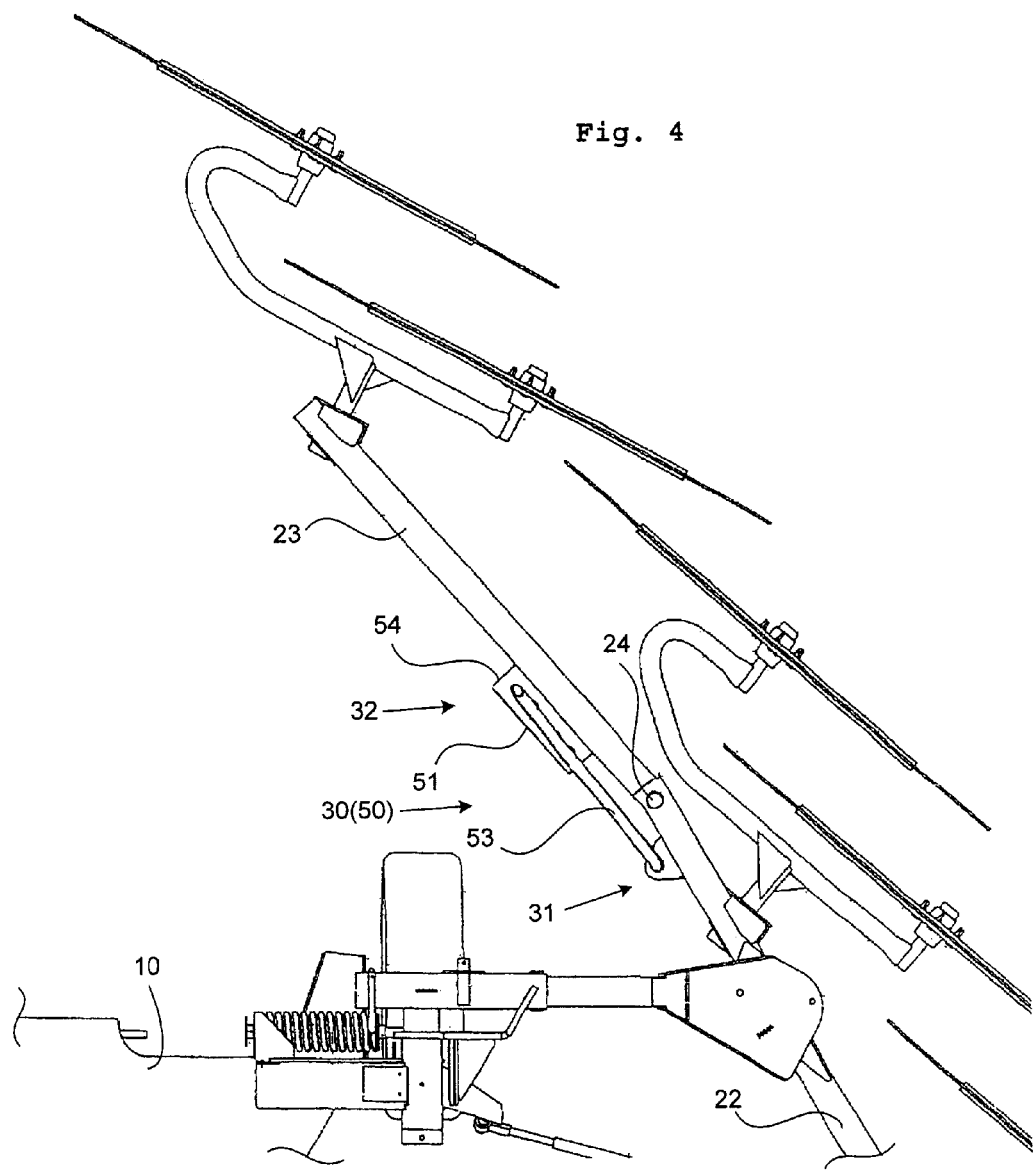
FIG. 4 is a top view of a portion of an arm assembly of an exemplary embodiment of the carted wheel rake.
Figure 5:
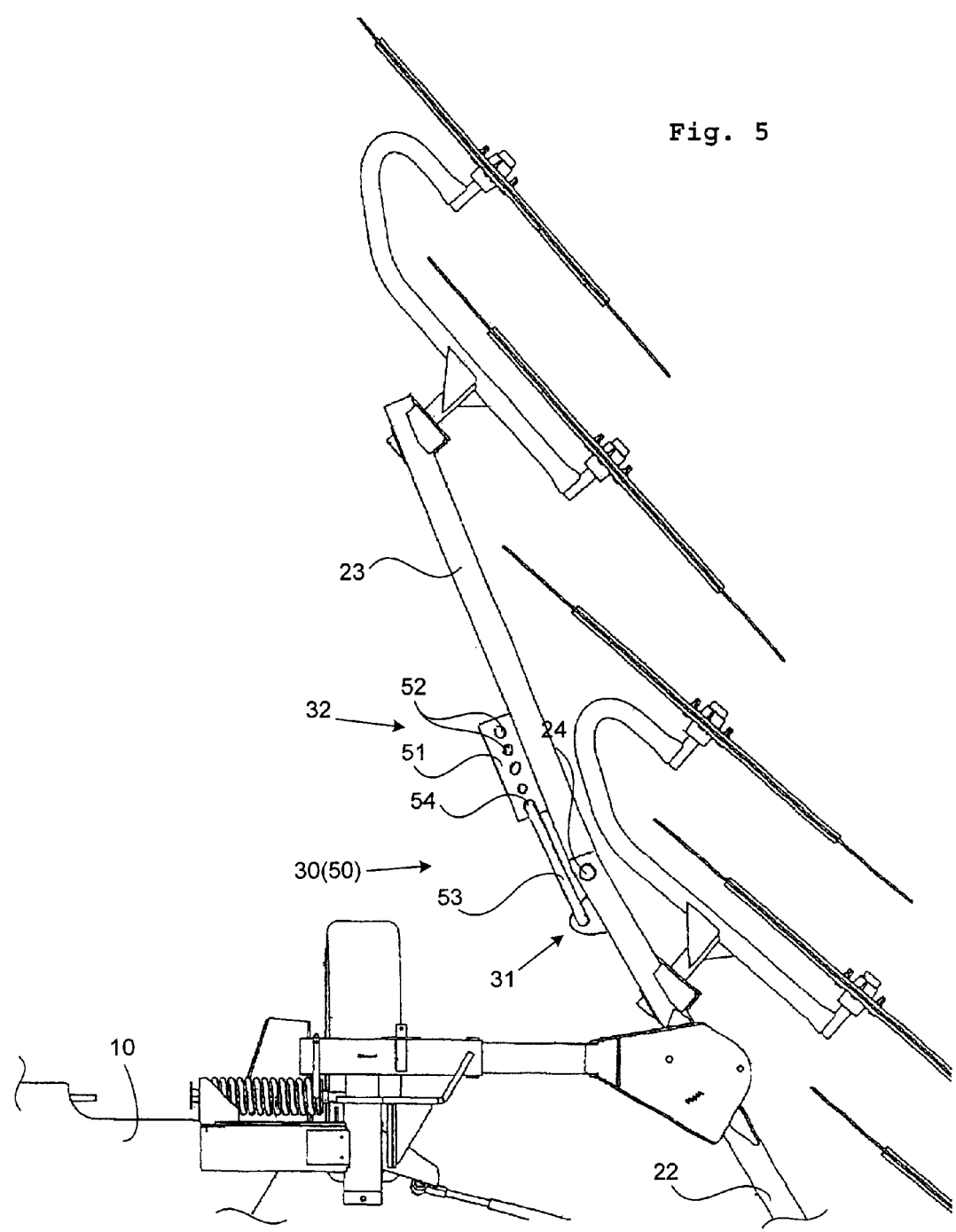
FIG. 5 is a top view of a portion of the arm assembly of the exemplary embodiment of the carted wheel rake in FIG. 4 with an adjustment to the angle between the members of the main beam.

The adjustment unit 30(50) shown in FIGS. 4 and 5 is a linkage system including a first adjustment component 51 disposed on the second member 23 and a second adjustment component 53 disposed between the first member 22 and the second member 23. The first adjustment component 51 may have a plate structure in which is located a plurality of engagement portions 52. The engagement portions 52 may be through holes or cavities in the first adjustment component 51. The second adjustment component 53 includes an extended rod having a first end thereof connected to the first member 22 at a first end 31 of the adjustment unit 30(50), and a pin 54 at the second end of the rod disposed at a second end 32 of the adjustment unit 30(50). The pin 54 corresponds in shape to the engagement portions 52 of the first adjustment component 51, so as to be inserted into the engagement portions 52. The pin 54 is removable from the engagement portions 52 to adjust the angle $\alpha$ between the first member 22 and the second member 23 by pivoting the second member 23 at pivot axis 24.

Figure 6:
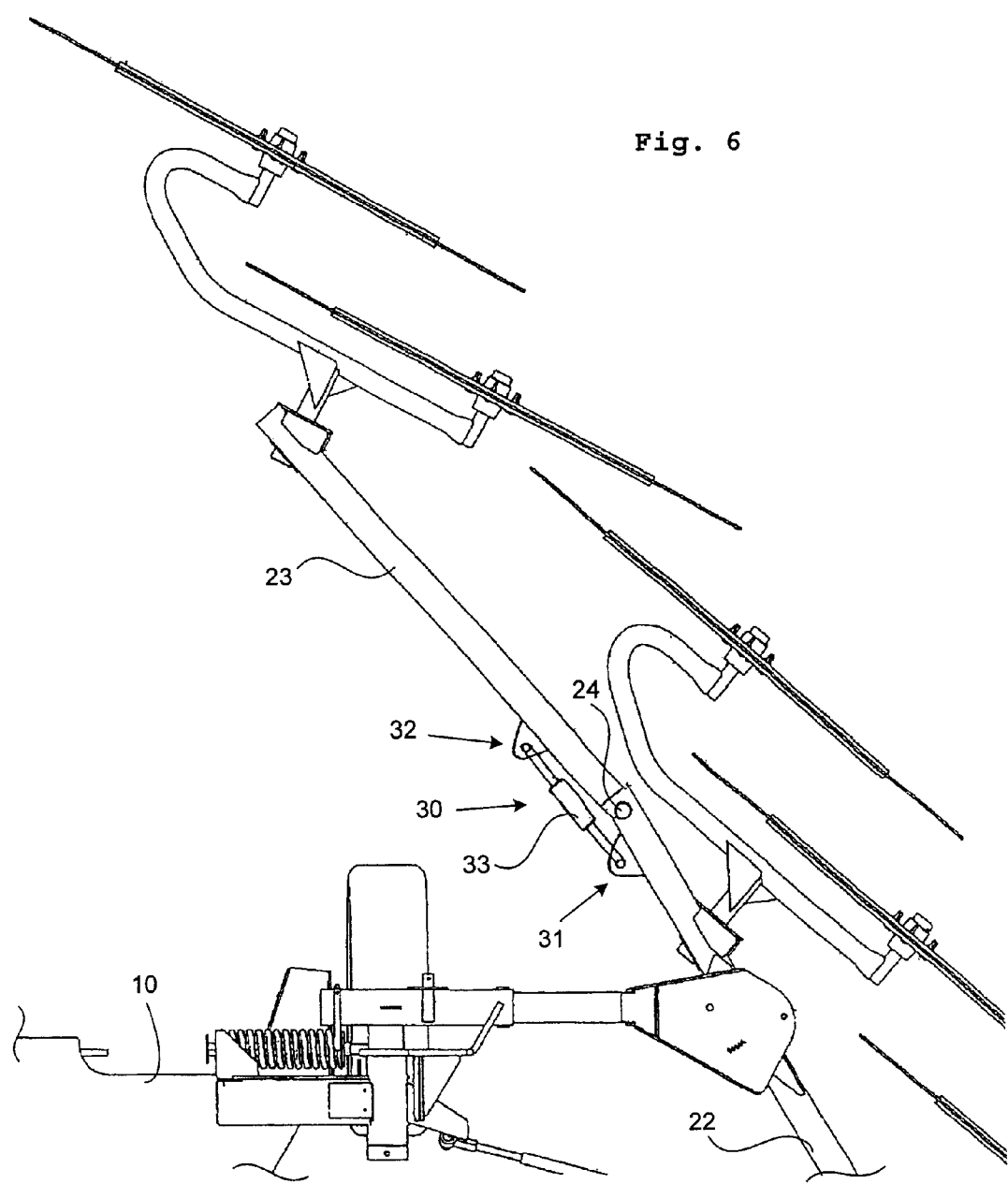
FIG. 6 is a top view of a portion of an arm assembly of another exemplary embodiment of the carted wheel rake.
Figure 7:
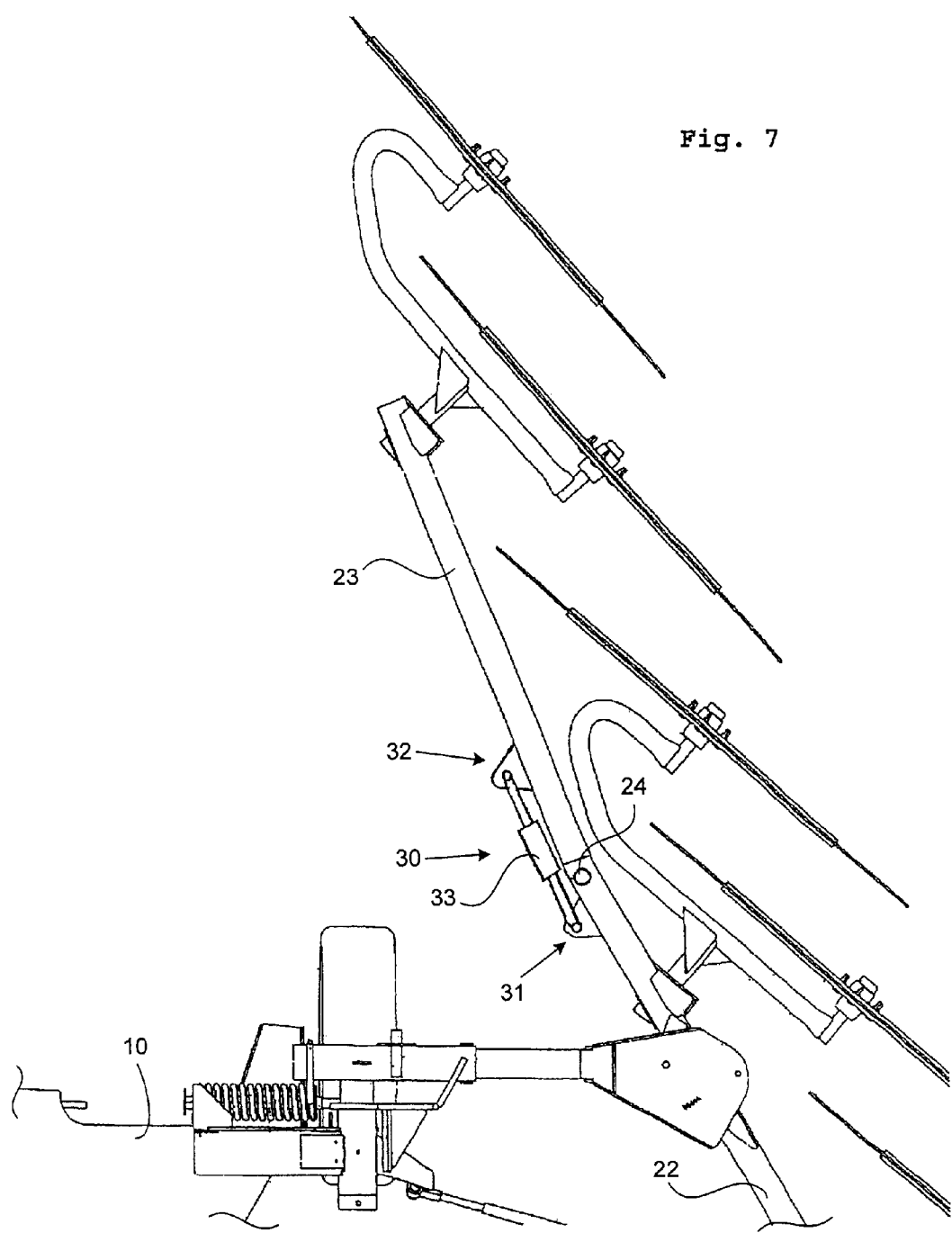
FIG. 7 is a top view of a portion of the arm assembly of the exemplary embodiment of the carted wheel rake in FIG. 6 with an adjustment to the angle between the members of the main beam.

Another embodiment of the adjustment unit 30 is shown in paired FIGS. 6 and 7. The adjustment unit 30 may include a link 33 that is one of a turnbuckle, a hydraulic actuator, or an electric actuator. The link 33 is disposed so as to extend between and be coupled to the first member 22 and second member 23 of the main beam 21. The specific structural location and orientation of the link 33 with respect to the first member 22 and second member 23 may vary depending on the desired range of angle $\alpha$, in order to allow both a reflex and an obtuse angle without interfering with the pivot axis 24 of the main beam 21.

Figure 8:
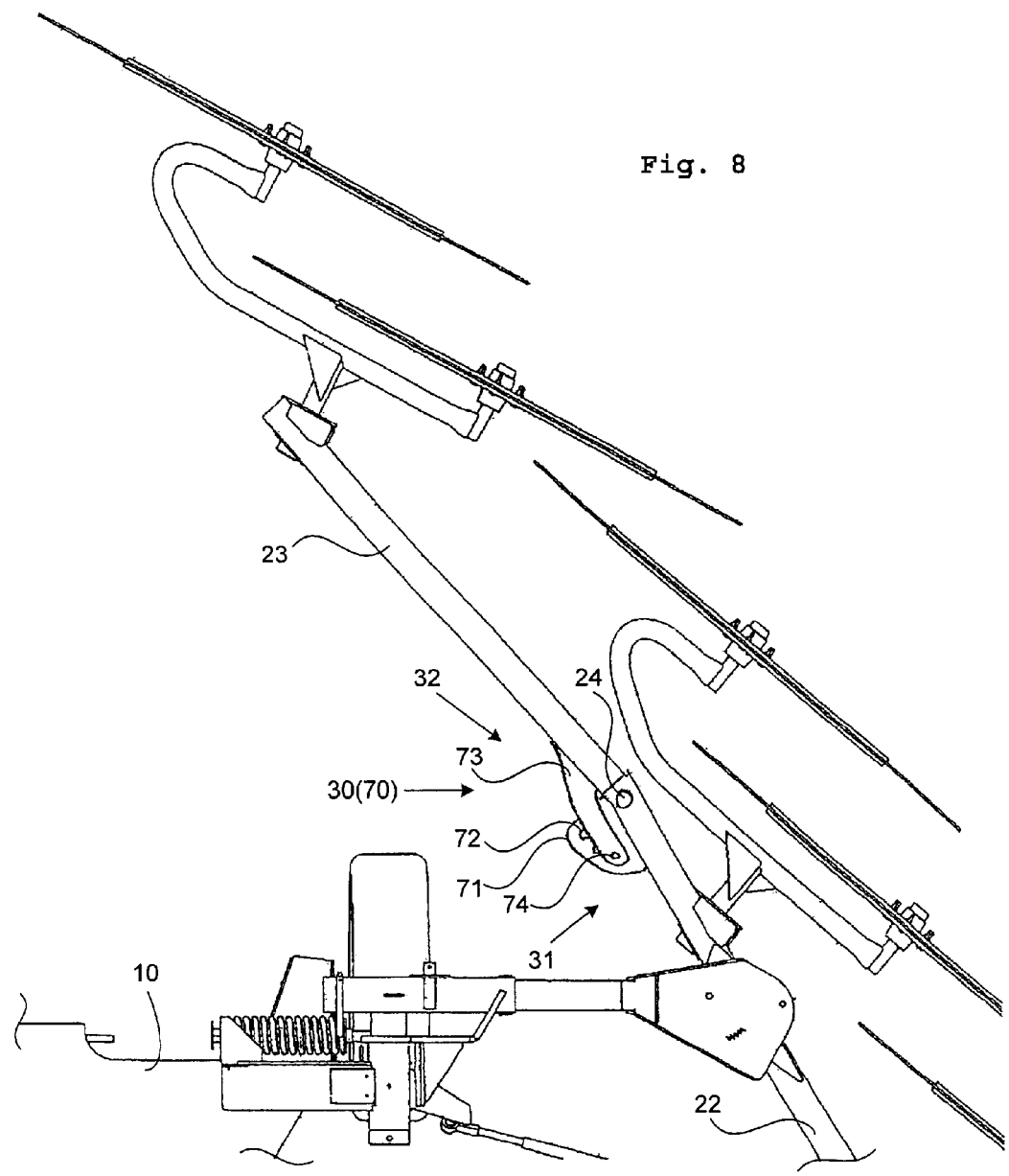
FIG. 8 is a top view of a portion of an arm assembly of another exemplary embodiment of the carted wheel rake.
Figure 9:
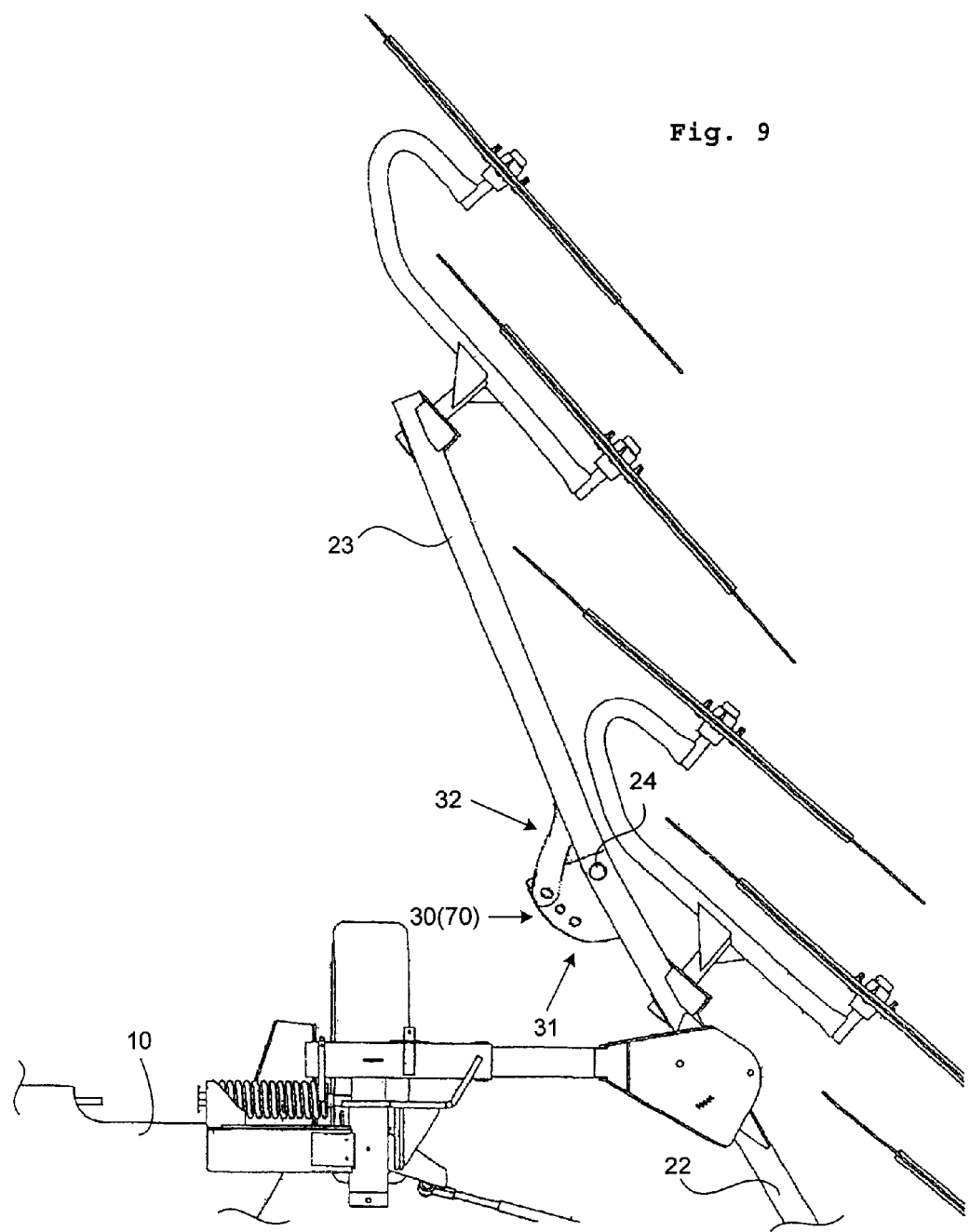
FIG. 9 is a top view of a portion of the arm assembly of the exemplary embodiment of the carted wheel rake in FIG. 8 with an adjustment to the angle between the members of the main beam.

In yet another embodiment, the adjustment unit 30(70) is shown in FIGS. 8 and 9 and is a linkage system including a first adjustment component 71 disposed on the first member 22 and a second adjustment component 73 disposed between the first member 22 and the second member 23. The first adjustment component 71 may have a plate structure in which is a plurality of engagement portions 72. The engagement portions 72 may be through holes or cavities in the first adjustment component 71. The second adjustment component 73 includes an elongated plate structure having a first end thereof connected to the second member 23 at the second end 32 of the adjustment unit 30(70), and a pin 74 at the second end of the plate disposed at the first end 31 of the adjustment unit 30(70). The pin 74 corresponds in shape to the engagement portions 72 of the first adjustment component 71, so as to be inserted into the engagement portions 72. The pin 74 is removable from the engagement portions 72 to adjust the angle $\alpha$ between the first member 22 and the second member 23 by pivoting the second member 23 at pivot axis 24.

Figure 10:
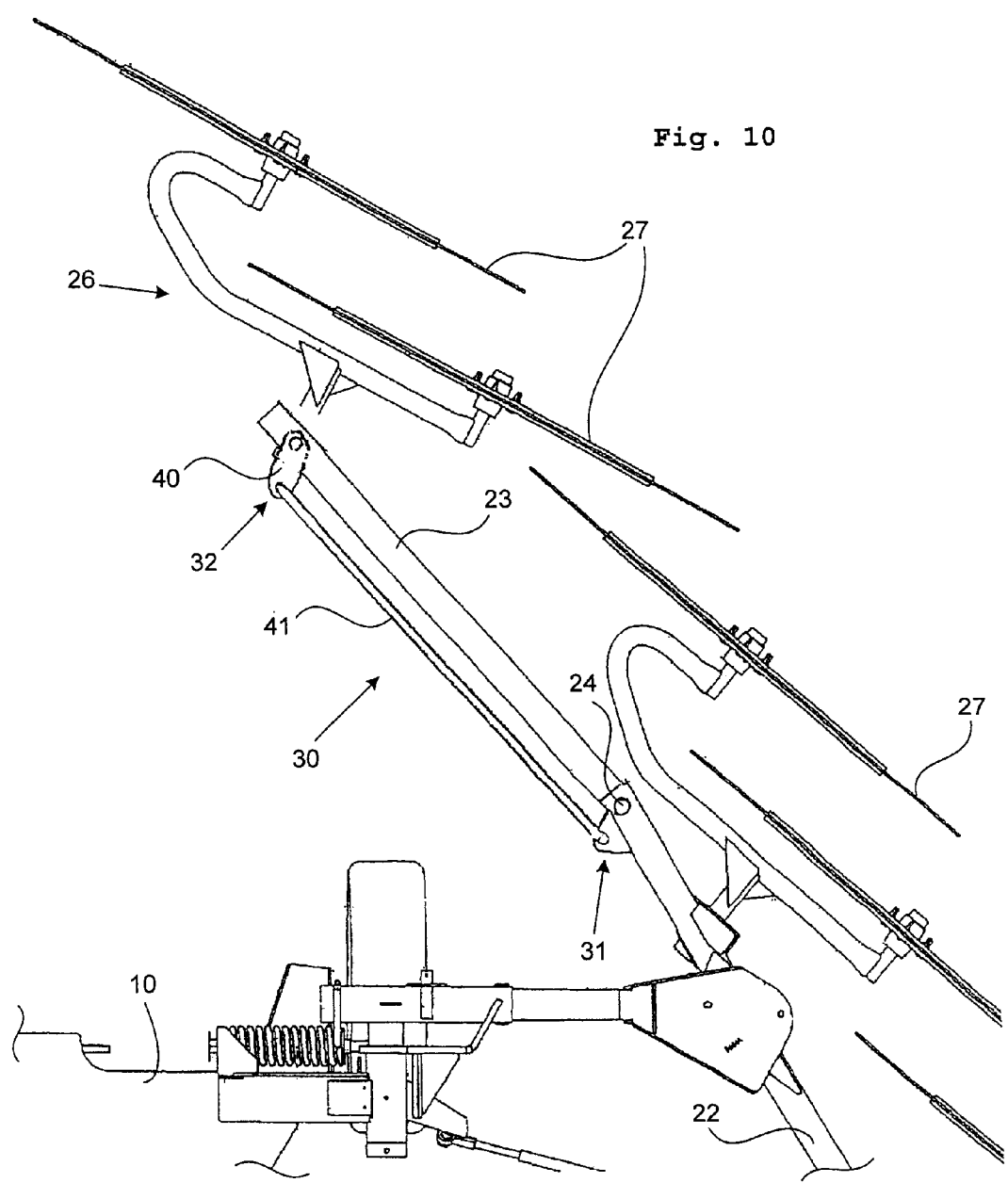
FIG. 10 is a top view of a portion of an arm assembly of another exemplary embodiment of the carted wheel rake.
Figure 11:
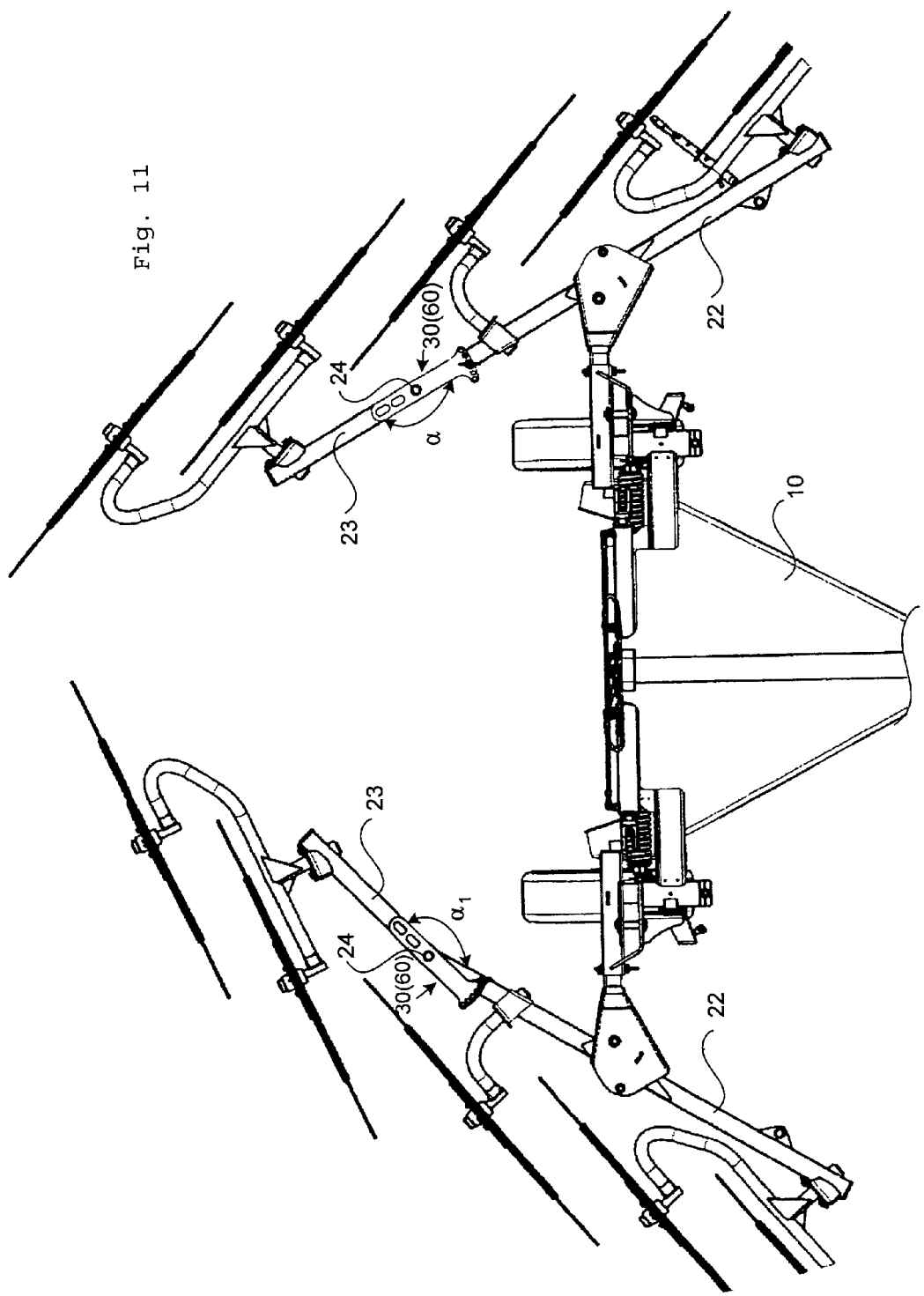
FIG. 11 is a top view of another exemplary embodiment of the carted wheel rake.
Figure 12:
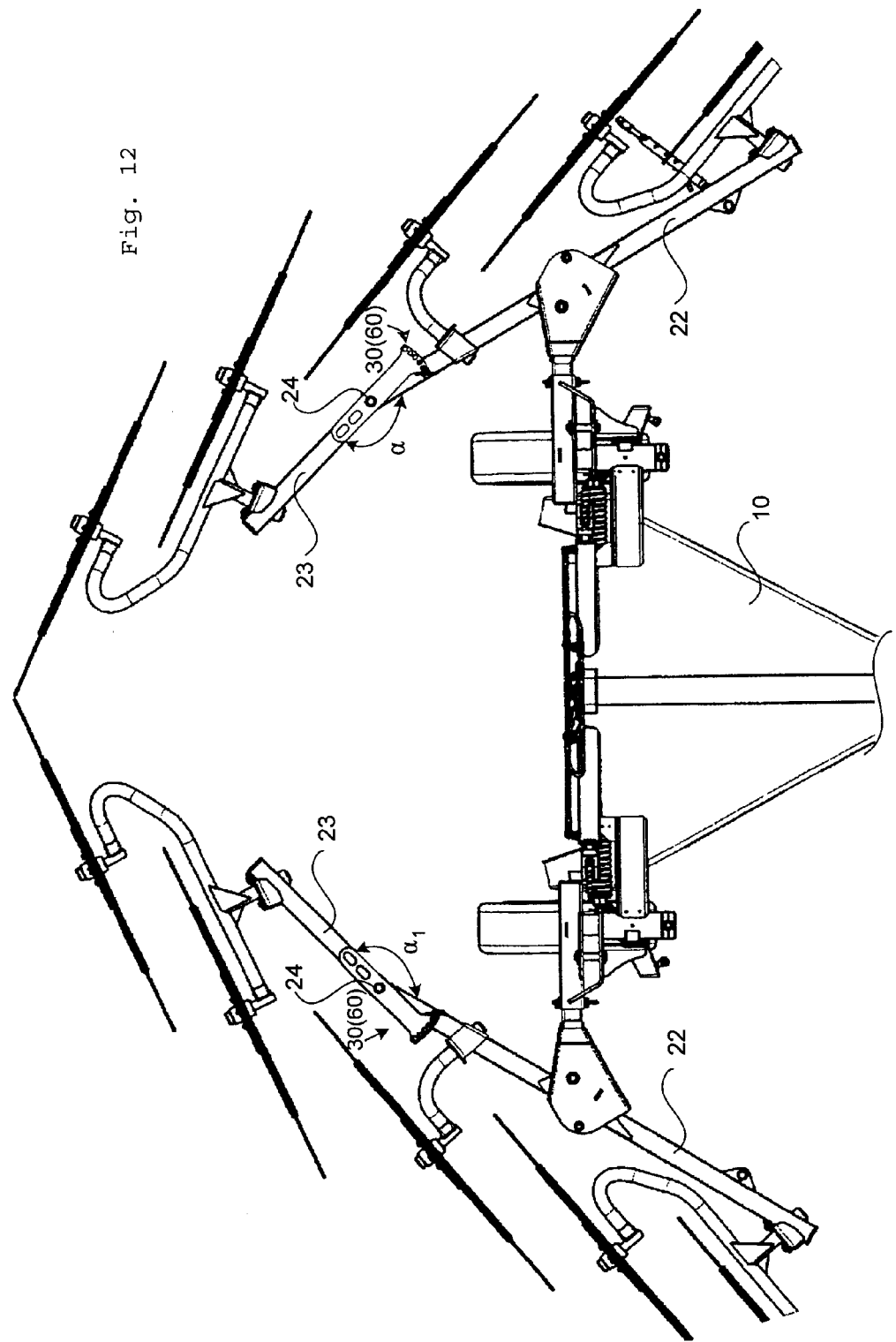
FIG. 12 is a top view of the exemplary embodiment of the carted wheel rake in FIG. 11 with an adjustment to the angle between the members of the main beams.
Figure 13:
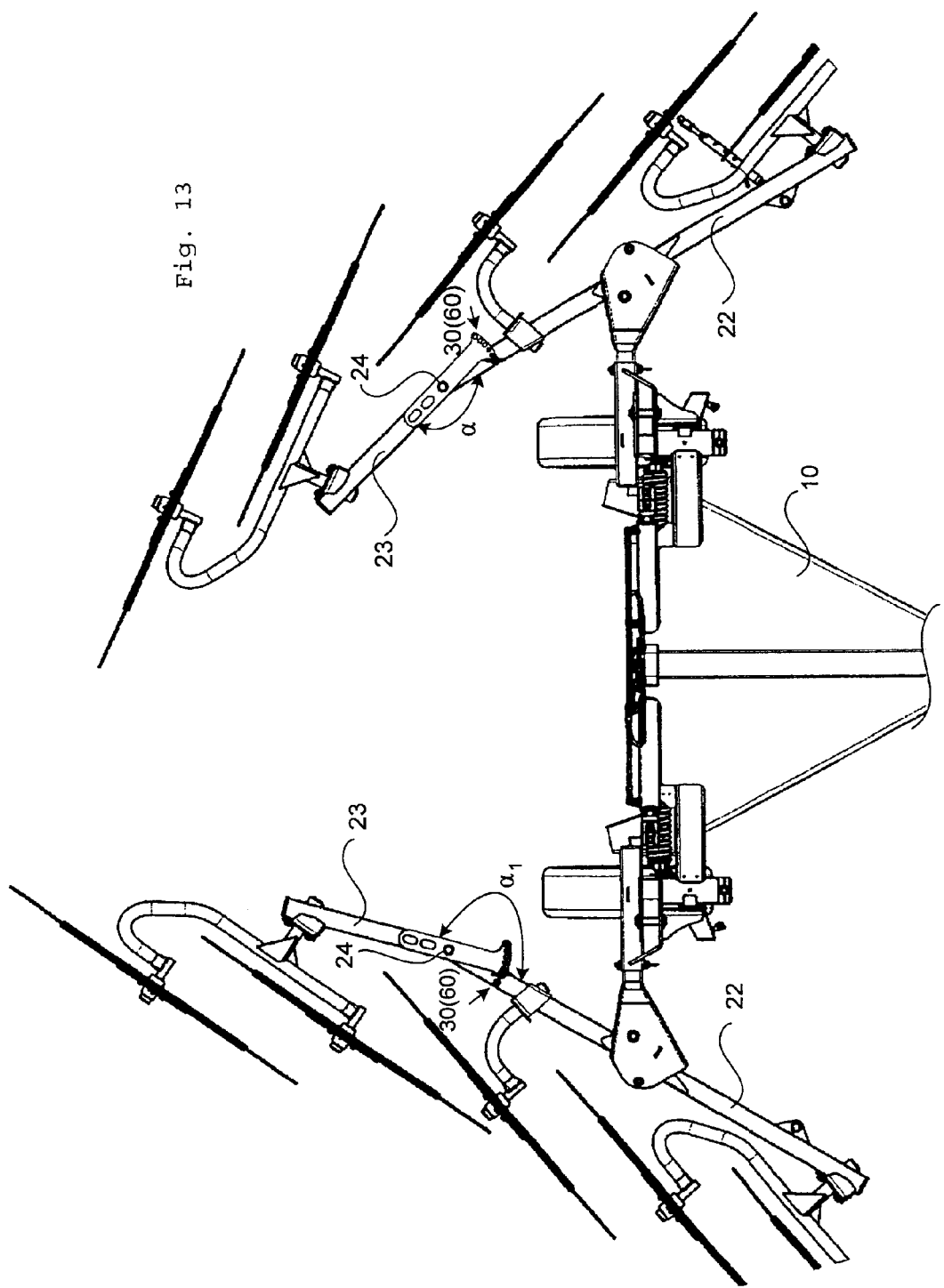
FIG. 13 is a top view of the exemplary embodiment of the carted wheel rake in FIG. 11 with another adjustment to the angle between the members of the main beam.
Figure 14:
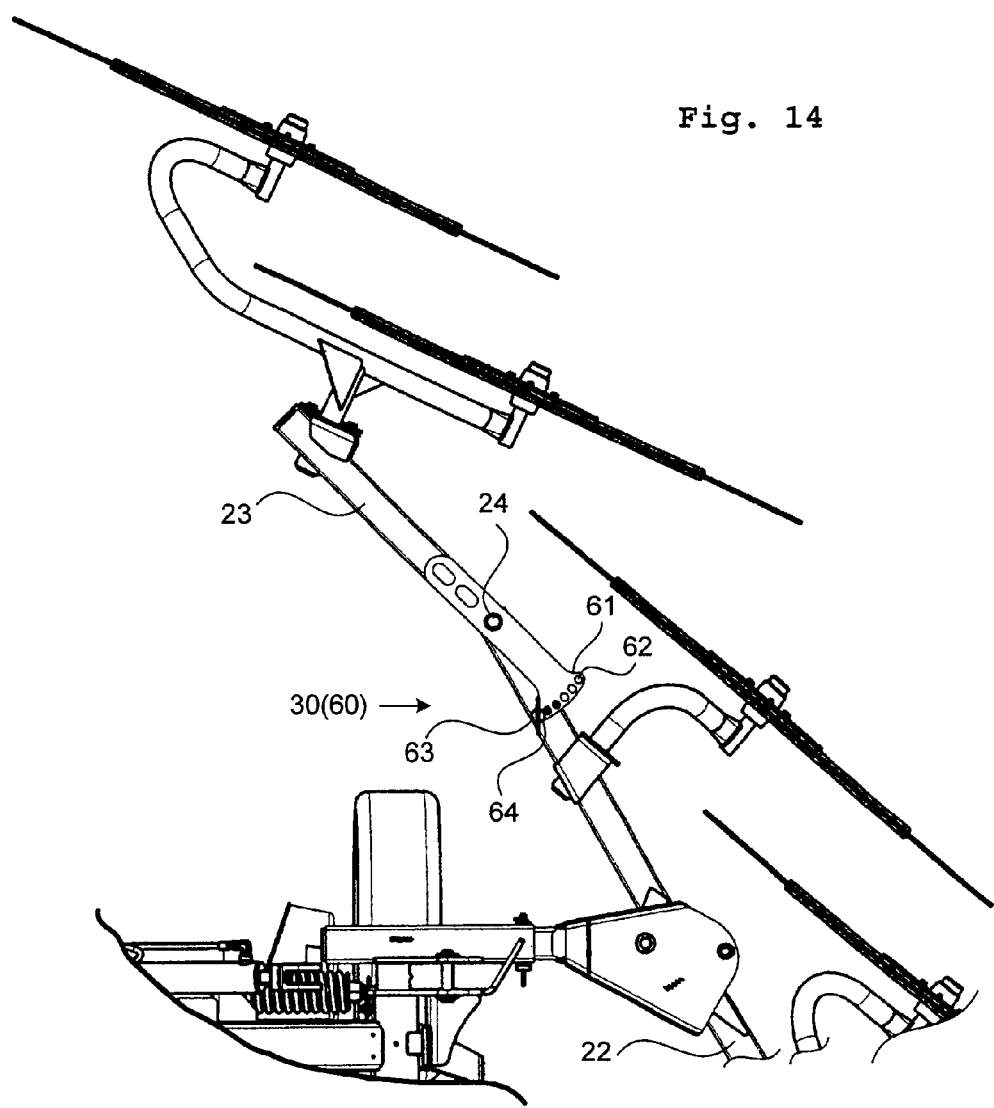
FIG. 14 is a top view of a portion of an arm assembly of the exemplary embodiment of the carted wheel rake shown in FIG. 11.

In another exemplary embodiment shown in FIG. 10, adjustment unit 30 allows for adjustment of the windrow by adjusting both the rear of the rake arm assembly 20 (i.e. the second member 23) relative to the front of the rake arm assembly 20 (i.e. the first member 22), and also by rotating the pair of floating rake wheels 27 in the second rake wheel unit 26. The combination of the two adjustments allows the orientation of the rake wheels 27 attached to the first member 22 and the second member 23 to be maintained so as to not miss any crop being raked. The rotation of the second rake wheel unit 26 is accomplished via a pivotable linkage joint 40 disposed at the rear end of the second member 23 that simultaneously connects the second rake wheel unit 26 to the second member 23. An extension link 41 is connected from the linkage joint 40 to the first end 31 of the adjustment unit 30 on the first member 22. Furthermore, the extension link 41 of the adjustment unit 30 shown in FIG. 10 may preferably be used in conjunction with one of the adjustment means shown in any of FIGS. 4-9 and 11-14, so as to secure the second member 23 in the desired position with respect to the first member 22.

FIGS. 11-14, (particularly FIG. 14), depict another embodiment of an adjustment unit 30(60). The adjustment unit 30(60) includes a first adjustment component 61 disposed on the second member 23 and a second adjustment component 63 disposed between the first member 22 and the second member 23. The first adjustment component 61 has a elongated plate structure in which a plurality of engagement portions 62 are found at an end thereof. The engagement portions 62 may be through holes and may be aligned along the end of the first adjustment component 61. The second adjustment component 63 includes a pin 64 or other engaging means to engage the first member 22 with the second member 23. The pin 64 corresponds in shape to the engagement portions 62 of the first adjustment component 61, so as to be inserted into the engagement portions 62. The pin 64 is removable from the engagement portions 62 to adjust the angle α between the first member 22 and the second member 23 by pivoting the second member 23 at pivot axis 24. In the embodiment of FIGS. 11-14, first member 22 may include a hole or cavity therein, as an element of the second adjustment component 63, with which to engage the pin 64 through the engagement portions 62. It is further noted that the second member 23 of each rake arm assembly 20 may be oriented at a different angle with respect to the first member 22, such that one rake arm assembly 20 (shown on the left of FIGS. 11-13) has an angle $α_1$ which may be different from angle α of the other rake arm assembly 20 (shown on the right of FIGS. 11-13).

In the work position, shown in FIGS. 1-3 and 11-13, the carted wheel rake assemblies 20 form a V-shape. It is noted that, when the front of the V-shape is opened as much as possible using conventional means, the angle on the rake main beams is fairly steep and the material does not flow as well on the wheel as when there is a smaller angle on the beams, which affects the overall flow of material.

Figure 15:
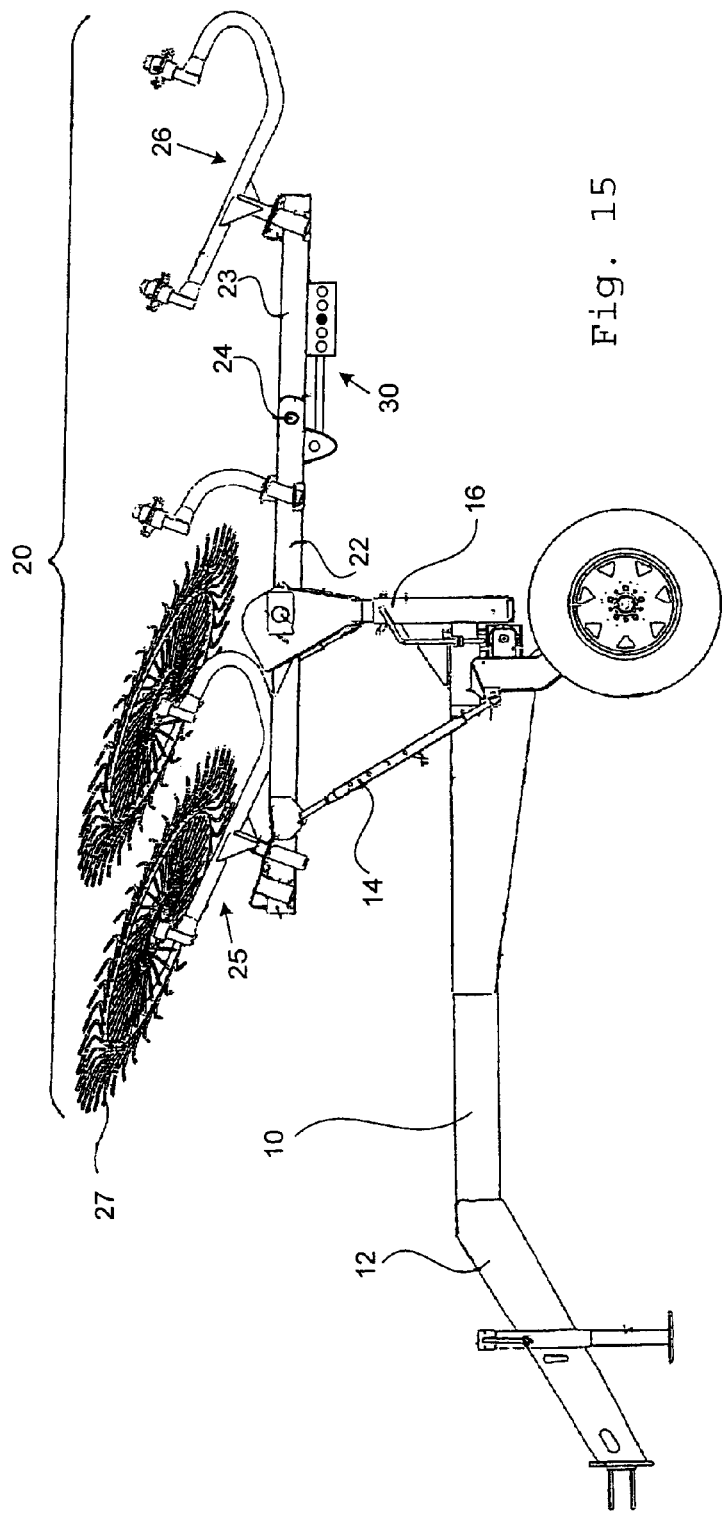
FIG. 15 is a side view of an exemplary embodiment of the carted wheel rake which shows the arm assemblies in a vertical transport position substantially above the frame.
Figure 16:
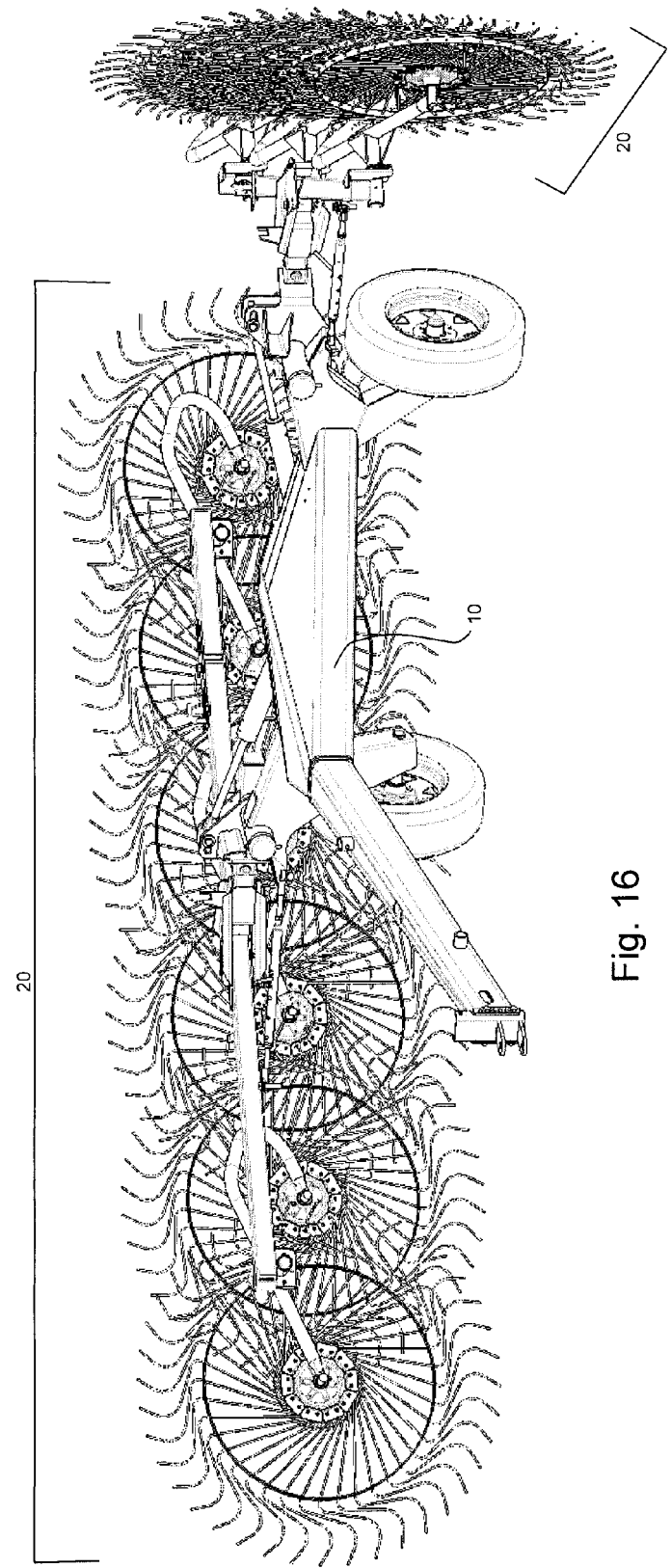
FIG. 16 is a perspective view of an exemplary embodiment of the carted wheel rake which shows the arm assemblies in a horizontal work position with respect to the frame.

FIG. 15 depicts a side view of the carted wheel rake apparatus showing the arm assemblies 20 being substantially vertically displaced above the frame 10 so as to be in a transport position. FIG. 16 depicts a perspective view of the carted wheel rake apparatus showing the arm assemblies 20 being substantially horizontal with respect to the frame 10 so as to be in a work position.

Accordingly, one exemplary embodiment reduces the overall angle in the first members 22 of main beams 21 with respect to the arm members 16 and uses the pivot axis 24 in the back to reduce the windrow in the back by pivoting the second member 23 at pivot axis 24. As such, there is less of an angle at the front of the V-shape in the work position, and therefore better material flow through the rake.

Obviously, numerous modifications and variations of the present invention are possible in light of the above teachings. It is therefore to be understood that within the scope of the appended claims, the invention may be practiced otherwise than as specifically described herein.

The invention claimed is:

1. A rake, comprising:
   a frame; and
   at least one arm assembly attached to the frame via an arm member, the arm assembly including
      a main beam coupled to the arm member, the main beam including a first member pivotally attached to a second member, the first and second members being substantially straight and an angle between the first and second members being adjustable,
      a first rake wheel unit connected to a front portion of the first member, and
      a second rake wheel unit connected to a rear portion of the second member,
   wherein the arm assembly attaches to the frame via the arm member and the arm member is adjustable such that in a work position, the first and second rake wheel units are disposed substantially horizontally extended with respect to frame, and in a transport position, the first and second rake wheel units are disposed substantially vertically above the frame,
   wherein the second member pivots about a pivot axis in two directions with respect to the first member, the pivot axis pivotally connecting a rear end of the first member and a front end of the second member, and
   wherein two rake wheels are attached to the second member.

2. The rake according to claim 1, wherein the first rake wheel unit includes at least one rake wheel.

3. The rake according to claim 1, further comprising an adjustment unit attached to the first and second members,
   wherein the angle between the first and second members is adjustable via the adjustment unit.

4. The rake according to claim 3, wherein the second rake wheel unit is connected to the second member via a linkage joint, and
   wherein a first end of the adjustment unit is connected to the first member and a second end of the adjustment unit is coupled to the linkage joint on the second member such that both a position of the second member and a position of the second rake wheel unit are adjustable via the adjustment unit with respect to the first member.

5. The rake according to claim 3, wherein the adjustment unit includes a turnbuckle.

6. The rake according to claim 3, wherein the adjustment unit includes a hydraulic actuator.

7. The rake according to claim 3, wherein the adjustment unit includes an electric actuator.

8. The rake according to claim 3, wherein the adjustment unit includes a linkage system, the linkage system including
   a first adjustment component having a series of engagement portions, and
   a second adjustment component extending between the first and second members, the second adjustment component engaging with the engagement portions of the first adjustment component.

9. The rake according to claim 8, wherein the engagement portions of the first adjustment component include holes therethrough, and
   wherein second adjustment component includes a pin for engaging in the holes in the first adjustment component.

10. The rake according to claim 8, wherein the engagement portions of the first adjustment component include cavities therein, and
    wherein second adjustment component includes a pin that engages in the cavities in the first adjustment component.

11. The rake apparatus according to claim 1, wherein the arm assembly includes a third rake wheel unit connected to the first member between the rear end of the first member and an attachment point of the first member to the arm member.

* * * * *